United States Patent [19]

Hirai et al.

[11] Patent Number: 5,373,441
[45] Date of Patent: Dec. 13, 1994

[54] AUTOMATIC TRANSLATING APPARATUS AND A METHOD THEREOF

[75] Inventors: Tokuyuki Hirai; Shuzo Kugimiya, both of Nara, Japan

[73] Assignee: Sharp Kabushiki Kaisha, Osaka, Japan

[21] Appl. No.: 51,874

[22] Filed: Apr. 26, 1993

[30] Foreign Application Priority Data

Apr. 28, 1992 [JP] Japan .................. 4-109695

[51] Int. Cl.⁵ .............................. G06F 15/02
[52] U.S. Cl. .................. 364/419.02; 364/419.03
[58] Field of Search .............. 364/419.02, 419.03, 364/419.01, 900

[56] References Cited

U.S. PATENT DOCUMENTS

| | | | |
|---|---|---|---|
| 4,641,264 | 2/1987 | Nitta et al. | 364/900 |
| 4,953,088 | 8/1990 | Suzuki et al. | 364/419 |
| 5,088,039 | 2/1992 | Kugimiya et al. | 364/419 |

FOREIGN PATENT DOCUMENTS 4-158477 10/1992 Japan .

Primary Examiner—Roy N. Envall, Jr.
Assistant Examiner—Khai Tran
Attorney, Agent, or Firm—Nixon & Vanderhye

[57] ABSTRACT

An automatic translating apparatus stores in a memory in machine readable format a plurality of translation combinations. Each translation combination includes (1) a predetermined part of speech such as an auxiliary verb of a source language like English, (2) a usage condition of that word, and (3) a translation word in a target language such as Japanese. A machine readable dictionary includes a plurality of entries. Each dictionary entry includes a source language word and a corresponding general translation word. A translation word is selectively retrieving from the translation combination memory or the general translation word stored in the dictionary based on the text of the source language and the usage condition of that word in the text. If a source text word corresponds to the predetermined part of speech, the source text word and its usage condition (e.g., the type of sentence in which the word is used) is matched to the translation combinations stored in memory. If there is a match, the corresponding translation word is retrieved from the memory. If there is no match, a general translation word is retrieved from the dictionary.

50 Claims, 10 Drawing Sheets

FIG.5

★★ AUXILIARY VERB ★★
TRANSLATION
SPECIFICATION

SELECT ONE FROM FOLLOWING
AUXILIARY VERBS
    40

○ can    ○ could    ○ may    ○ might
○ must    ○ shall    ○ should    ○ will
○ would

MOVE CURSOR KEY TO AUXILIARY VERB AND DEPRESS RETURN KEY

CANCEL     < F24 KEY >

FIG.6

★★ AUXILIARY VERB ★★
TRANSLATION
SPECIFICATION

| SELECT FROM FOLLOWING CONDITIONS | | AUXILIARY <SHALL> VERB |
|---|---|---|
| CONDITION 1 | CONDITION 2 | SPECIFIED TRANSLATION WORD |
| AFFIRMATIVE | DECLARATIVE SENTENCE | べきである /43 |
| AFFIRMATIVE | INTERROGATIVE SENTENCE | SYSTEM SPECIFIED TRANSLATION |
| NEGATIVE | DECLARATIVE SENTENCE | システム設定訳語 |
| NEGATIVE 41 | INTERROGATIVE SENTENCE 42 | < NOT TRANSLATED > |

MOVE CURSOR KEY TO TRANSLATION WORD AND DEPRESS RETURN KEY
CONFIRM BY OK KEY AFTER SPECIFICATION
CANCEL   < F24 KEY >

FIG.7

★★ AUXILIARY VERB ★★
TRANSLATION
SPECIFICATION

| SELECT FROM FOLLOWING TRANSLATION WORDS | | AUXILIARY ＜SHALL＞ VERB |
|---|---|---|
| CONDITION 1 | CONDITION 2 | SPECIFIED TRANSLATION WORD |
| NEGATIVE | DECLARATIVE SENTENCE | SYSTEM SPECIFIED TRANSLATION |

44 ↗ ○ないことになっている
○ないであろう
○べきでない
45 ↗ ○ない予定である
○ないであげよう
○てはいけない
○＜NOT TRANSLATED＞
○＜SYSTEM SPECIFIED TRANSLATION＞

MOVE CURSOR KEY TO TRANSLATION WORD AND DEPRESS RETURN KEY
CANCEL  ＜F24 KEY＞

FIG.9

★★ AUXILIARY VERB ★★
TRANSLATION
SPECIFICATION

| SELECT FROM FOLLOWING CONDITIONS | | AUXILIARY <SHALL> VERB |
|---|---|---|
| CONDITION 1 | CONDITION 2 | SPECIFIED TRANSLATION WORD |
| AFFIRMATIVE | DECLARATIVE SENTENCE | べきである  /43 |
| AFFIRMATIVE | INTERROGATIVE SENTENCE | SYSTEM SPECIFIED TRANSLATION |
| NEGATIVE | DECLARATIVE SENTENCE | べきでない |
| NEGATIVE | INTERROGATIVE SENTENCE | < NOT TRANSLATED > |
| 41 | 42 | |

MOVE CURSOR KEY TO TRANSLATION WORD AND DEPRESS RETURN KEY

CONFIRM BY OK KEY AFTER SPECIFICATION

CANCEL   < F24 KEY >

FIG.10

| AUXILIARY VERB | AFFIRMATIVE· DECLARATIVE SENTENCE | AFFIRMATIVE· INTERROGATIVE SENTENCE | NEGATIVE· DECLARATIVE SENTENCE | NEGATIVE· INTERROGATIVE SENTENCE |
|---|---|---|---|---|
| may | かもしれない<br>であろう<br>ことである<br>でもよい<br>でもさしつかえない<br>ことができる<br>とよい<br>ばよい | かもしれないか<br>であろうか<br>ことであるか<br>でもよいか<br>でもさしつかえないか<br>ことができるか<br>とよいか<br>ばよいか | ないかもしれない<br>ないであろう<br>ないことである<br>ではいけない<br>—<br>ことができない<br>ないとよい<br>なければよい | ないかもしれないか<br>ないであろうか<br>ないことであるか<br>ではいけないか<br>—<br>ことができないか<br>ないとよいか<br>なければよいか |
| can | ことができる<br>ことはあり得る<br>はずである<br>であろう<br>でもよい<br>であげよう<br>— | ことができるか<br>ことはあり得るか<br>はずであるか<br>であろうか<br>でもよいか<br>であげようか<br>でくれませんか | ことができない<br>ことはあり得ない<br>はずがない<br>ないであろう<br>ではいけない<br>ないであげよう<br>— | ことができないか<br>ことはあり得ないか<br>はずがないか<br>ないであろうか<br>ではいけないか<br>ないであげようか<br>でくれませんか |
| shall | ことになっている<br>であろう<br>べきである<br>予定である<br>であげよう<br>なければならない | ことになっているか<br>であろうか<br>べきであるか<br>予定であるか<br>であげようか<br>なければならないか | ないことになっている<br>ないであろう<br>べきでない<br>ない予定である<br>ないであげよう<br>ではいけない | ないことになっているか<br>ないであろうか<br>べきでないか<br>ない予定であるか<br>ないであげようか<br>ではいけないか |

AUTOMATIC TRANSLATING APPARATUS AND A METHOD THEREOF

BACKGROUND OF THE INVENTION

1. Field of the Invention

The present invention relates to an apparatus for automatically translating a language and a method thereof.

2. Description of the Related Art

In general, an automatic translating apparatus reads a source text written in a source language (for example, English) and carries out morphological analysis. Then, a dictionary for translation is accessed to obtain grammatical information such as the part of speech for each word and a corresponding translation word for the target language, followed by analysis of the tense, person, number, and the like. An internal structure of the source language as a result of the morphological analysis and rules prepared in advance for that source language. The internal structure of the source language is transformed into an internal structure of the target language using a transformation rule. In accordance with the transformed internal structure, a translated sentence in the target language is generated using the translation words obtained by the dictionary look-up process during the morphological analysis.

In order to obtain an appropriate translation of the target language, an appropriate selection of a translation word for the target language is important. The selection of a translate on word conventionally includes the problems set forth in the following .

For example, the English language has the following problem regarding the auxiliary verb. Differing from other parts of speech such as the verb and noun, the auxiliary verb varies in its translation according to the "circumstance" in which it is used. This circumstance includes conditions such as whether the sentence including that word is an affirmative sentence or a negative sentence, or whether it is a declarative sentence or an interrogative sentence. Because the translation varies according to its circumstance as in the case of an auxiliary verb, just a simple translation setting will have a great side effect, making it harder to obtain an appropriate translation. For example, the word "may" alone will be translated into "suru kamo shirehal" in Japanese. In contrast, in the case of "may not", the translation should be "shite wa ikenai" Therefore, an adequate result can not be obtained just by setting a translation for an auxiliary verb of the English language to translate into a target language, for example Japanese.

In order to solve such a problem, there is a device having the priority allocated in advance for a translation word. A plurality of translation words are displayed according to this priority at the time of translation, whereby the operator selects an appropriate one. An example of such a technique is disclosed in Japanese Patent Laying-Open No. 61-90272.

A known improvement to the above-described technique includes update of the priorities of the translation words based on a learning process of the result selected by the operator. Such a technique is disclosed in Japanese Patent Laying-Open No. 63-136265, for example.

However, if the priorities for translation words are allotted and the display for selection is carried out according to the priority, the order of the displayed translation word or the selected result may not be appropriate for some subjects to be translated.

For example, consider the English auxiliary verb "shall". When the sentence including "shall" is an affirmative and declarative sentence in the first person, the translation output is "SURU DARO", otherwise "SURU KOTO NI NATTEIRU". However, in the case of translating a document related to the patent field, for example, the auxiliary verb "shall" should be output as "subeki" in most cases. In contrast, it is better to output the above former translation in a general literature.

In a conventional device where a priority is fixedly allocated to each translation word, the operator had to specify an appropriate translation for substitution every time this auxiliary verb appears in a sentence. In a conventional device where the display order of a translation word is changed according to a learning process of selected results, the learned result could be reflected only after the selection process was carried out several times in the case of translating documents of particular field such as patent related documents. Furthermore, the learned result obtained during translation of particular documents such as patent related documents would be lost if translation of a document of another field is carried out or when the power of the device is turned off. When the translation of a document of the same particular field such as patent related document is to be carried out subsequently, the specification of an appropriate translation had to be newly carried out.

SUMMARY OF THE INVENTION

In view of the foregoing, an object of the present invention is to provide a method and an automatic translating apparatus that can carry out more appropriately translation of a source text including a word of a particular part of speech that must have its translation varied according to the used environment.

Another object of the present invention is to provide a method and an automatic translating apparatus that can carry out more easily and appropriately translation of source texts of the same field or same area including a word of a particular part of speech that must have its translation varied according to the used environment.

A further object of the present invention is to provide a method and an automatic translating apparatus that can carry out more easily and appropriately translation of source texts of a plurality of fields or a plurality of various areas including a word of a particular part of speech that must have its translation varied according to the used environment.

An automatic translating apparatus according to the present invention includes: a memory device; a device for preparing in advance in the memory device in a machine readable format a plurality of translation combinations constituted by a predetermined part of speech word, for example an auxiliary verb of a predetermined source language (for example, English), an appearing condition of that word, and a translation word of a predetermined target language (for example, Japanese) selected in advance based on the word and the appearing condition; a machine readable dictionary including a plurality of entries, each entry including a word in the source language and a translation word selected in advance as a general translation of that word; a module for selectively retrieving a translation for a word from the translation combination or the dictionary based on each of the words included in the text of the source language and the appearing condition in the text of that word; and a module for translating the text of a source language into the text of a target language using the translation words extracted for each of the words in the text of the source language by the retrieve module.

In this automatic translating apparatus, a plurality of translation combinations are prepared in advance in the memory device in a machine readable format. At the time of translating the text of the source language, a translation word is selectively retrieved from the translation combinations or dictionary stored in the memory device according to each of the words of a particular part of speech included in the text of the source language and the appearing condition in which each word appears in that text, whereby translation of tile text is executed according to the extracted words. Because a translation word can be extracted from the translation combinations in the memory device when a certain word appears under a particular condition, a word required to have its translation varied according to the appearing condition can be output as an appropriate word.

A method of automatic translation according to the present invention is to translate a text of a source language into a text of a target language in an automatic translating apparatus including a memory device and a module for translating the text of the source language into the text of the target language by receiving the text having a translation word of the target language allocated to each word of the text of the source language. This method includes the steps of: preparing in advance in the memory device in a machine readable format a plurality of translation combinations including a predetermined part of speech word of the source language, the appearing condition of that word, and the translation word in the target language selected in advance according to that word and the appearing condition; and preparing a machine readable dictionary including a plurality of entries, each including a word of the source language, and a translation word thereof selected in advance as a general translation. This method further includes the steps of: selectively retrieving a translation word of a word from the translation combinations or the dictionary according to each word included in the text of the source language and the appearing condition in the text of that word; and translating the text of the source language into the text of the target language using the retrieved translation words.

In this automatic translating method, a plurality of translation combinations are prepared in advance in a memory device in a machine readable format. At the time of translating the text of the source language, a translation word is selectively retrieved from the translation combinations or dictionary stored in the memory device according to each of words of a certain part of speech included in the text of the source language and the appearing condition in the text, whereby translation of the text is executed according to the retrieved words. Because a translation word can be retrieved from the translation combinations in the memory device when a certain word appears under a particular condition, a word whose translation word should be selected according to the appearing condition can be translated appropriately.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 schematically shows an auxiliary verb selection menu.

FIG. 6 schematically shows a condition specify menu.

FIG. 7 schematically shows a translation specify menu.

FIG. 9 schematically shows a condition select menu of after a translation word is selected.

FIG. 10 schematically shows three typical auxiliary verbs and translation candidates allocated by the appearing conditions.

DESCRIPTION OF THE PREFERRED EMBODIMENTS

An embodiment of the present invention will be described in detail hereinafter with reference to the drawings. Although the following embodiment is described of machine translation from English to Japanese, the present invention is not limited to this and can similarly be applied to other languages such as from Japanese to English, between Japanese and a language other than English, or between languages other than Japanese.

Figure 1:
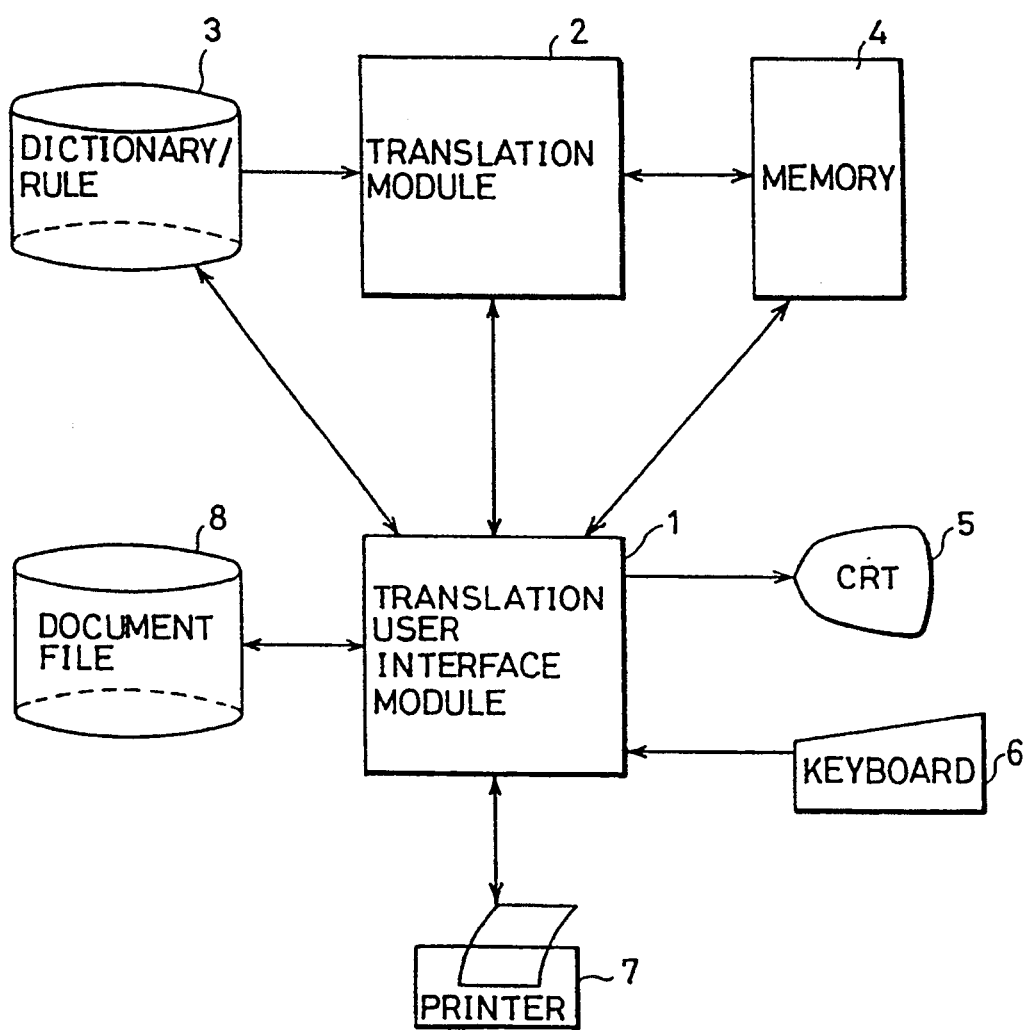
FIG. 1 is a block diagram of a machine translating apparatus according to an embodiment of the present invention.

FIG. 1 is a block diagram of a machine translating apparatus according to an embodiment of the present invention. Referring to FIG. 1, a machine translation apparatus includes a translation user interface module 1, a translation module 2, a dictionary/rule 3 storing dictionary for translation, grammatical rules, and a tree structure transformation table, a memory for translation 4, a CRT (Cathode Ray Tube) 5 and a keyboard 6 connected to translation user interface module 1, a document file 8 connected to translation user interface module 1, and a printer 7 connected to translation user interface module 1.

Figure 2:
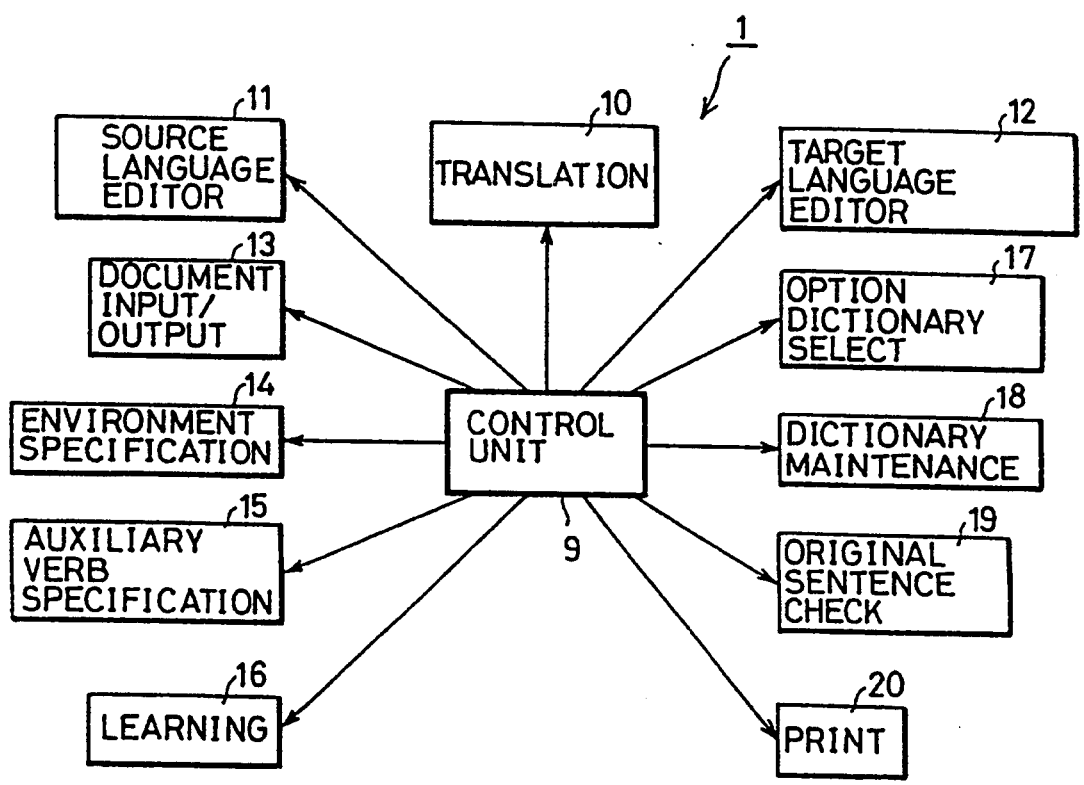
FIG. 2 is a block diagram of a translation user interface module.

Referring to FIG. 2, translation user interface module 1 includes a control unit 9 for reading out an externally applied request such as via a key input by a user through keyboard 6 and for calling each of the modules which will be described in the following. Translation user interface module 1 further includes a translation unit 10, a source language editor 11, a target language editor 12, a document input/output module 13, an environment specifying module 14, an auxiliary verb specifying module 15, a learning module 16, an option dictionary selection module 17, a dictionary maintenance module 18, an original sentence checking module 19, and a printer module 20, all connected to control unit 9.

Figure 3:
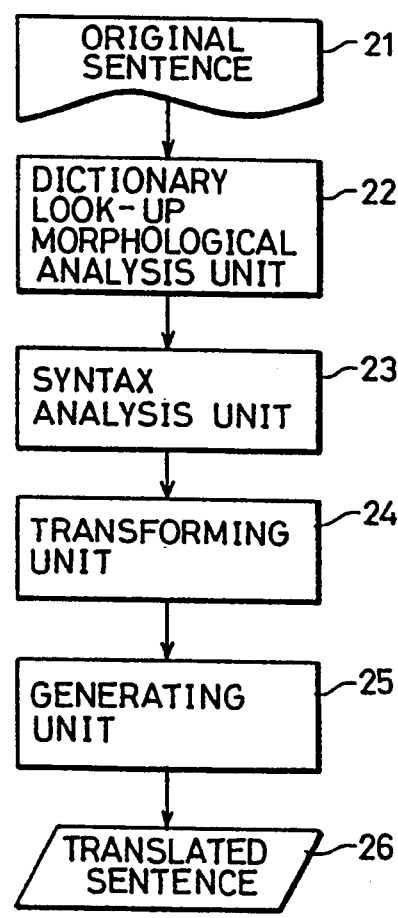
FIG. 3 is a block diagram of a translation module.

Referring to FIG. 3, translation module 2 shown in FIG. 1 includes a dictionary look-up/morphological analysis unit 22 for reading out an original sentence 21 stored in memory 4 of FIG. 1 to carry out dictionary look-up/morphological analysis, a syntax analysis unit 23 for carrying out a syntax analysis according to the processing results of dictionary look-up/morphological analysis unit 22 to obtain an internal structure (tree structure and the like) of original sentence 21 in the source language, a transforming unit 24 for transforming the obtained internal structure into an internal structure of a target language by referring to a tree structure transformation table included in dictionary/rule 2 (refer to FIG. 1), and a generating unit 25 for generating a translation sentence 26 in the target language according to the transformed internal structure of the target language.

Referring to FIG. 1 again, keyboard 6 serves to provide to translation user interface module 1 various commands and information for the maintenance of dictionary/rule 3 according to a manual operation of the user. Dictionary/rule 3 stores dictionaries and grammatical rules for translation, a tree structure transformation rule table and the like, as mentioned above. The dictionaries included in dictionary/rule 3 include a user dictionary, a specialized dictionary, a learning dictionary and the like. The process for selecting an option of these dictionaries is carried out by option dictionary selection module 17 shown in FIG. 2. The maintenance of the dictionaries such as registration and deletion of the headings of these dictionaries is carried out by dictionary maintenance module 18 shown in FIG. 2. Dictionary maintenance is well known and will not be described in detail here.

Referring to FIG. 2, translation unit 10 calls up translation module 2 shown in FIG. 1. Document file input/output module 13 carries out the input and output of an original sentence and a translation sentence with document file 8 shown in FIG. 1. Learning module 16 and dictionary maintenance module 18 serve to process the dictionaries included in dictionary/rule 3. An internal buffer is provided in memory 4 of FIG. 1 for storing information indicating which translation word in Japanese is to be assigned according to the environment of the appearing word for each English auxiliary verb. Auxiliary verb translation specifying module 15 of FIG. 2 serves to store in internal buffer in memory 4 a combination constituted by a word of the source language, the appearing condition thereof, and a translation thereof used by the user via keyboard 6 and CRT 5 shown in FIG. 1.

The operation of this machine translating apparatus is set forth in the following. First, the operation of auxiliary verb translation specifying module 15 will be described with reference to FIG. 4 to specify which translation word is to be assigned according to the appearing condition of an auxiliary verb for each English auxiliary verb.

The conditions required for specific translation of an auxiliary verb are as follows. In the present embodiment, affirmative/negative is set as condition 1 and declarative/interrogative is set as condition 2 by which the appearing conditions are classified to select a translation word. The appearing condition of one auxiliary verb is classified into four cases of (affirmative-declarative), (affirmative-interrogative), (negative-declarative), and (negative-interrogative).

In the present embodiment, one translation word is specified for each of the above-described four types of conditions for each auxiliary verb. A buffer for storing one translation word with respect to each set of an auxiliary word and condition is prepared in memory 4 of FIG. 1.

The data structure of the internal buffer prepared in memory 4 is shown in the following Table 1.

TABLE 1

| Auxiliary Verb | Usage Type | Translation Word |
|---|---|---|
| may | affirmative/declarative | subeki de aru |
| may | affirmative/interrogative | SYSTEM_DEPEND |
| may | negative/declarative | SYSTEM_DEPEND |
| may | negative/interrogative | SYSTEM_DEPEND |
| can | affirmative/declarative | SYSTEM_DEPEND |
| can | affirmative/interrogative | SYSTEM_DEPEND |
| can | negative/declarative | SYSTEM_DEPEND |
| can | negative/interrogative | SYSTEM_DEPEND |
| shall | affirmative/declarative | beki de aru |
| shall | affirmative/interrogative | YAKUSHUTU SINAI |
| shall | negative/declarative | beki de nai |
| shall | negative/interrogative | SYSTEM_DEPEND |
| . | . | . |
| . | . | . |
| . | . | . |

The words represented by large alphabet letters in Table 1 mean that a particular translation is not stored in the internal buffer, and that a predetermined process is to be carried out according to the flag represented by these large alphabet letters. The flag "SYSTEM_DEPEND" indicates "follow system specific translation". This means that a process similar to the conventional case is carried out when this flag is indicated. The flag "YAKUSHUTSU_SINAI" indicates "do not provide a translation of this auxiliary verb". This means that the corresponding translation is to be generated as a NULL character string.

Figure 4:
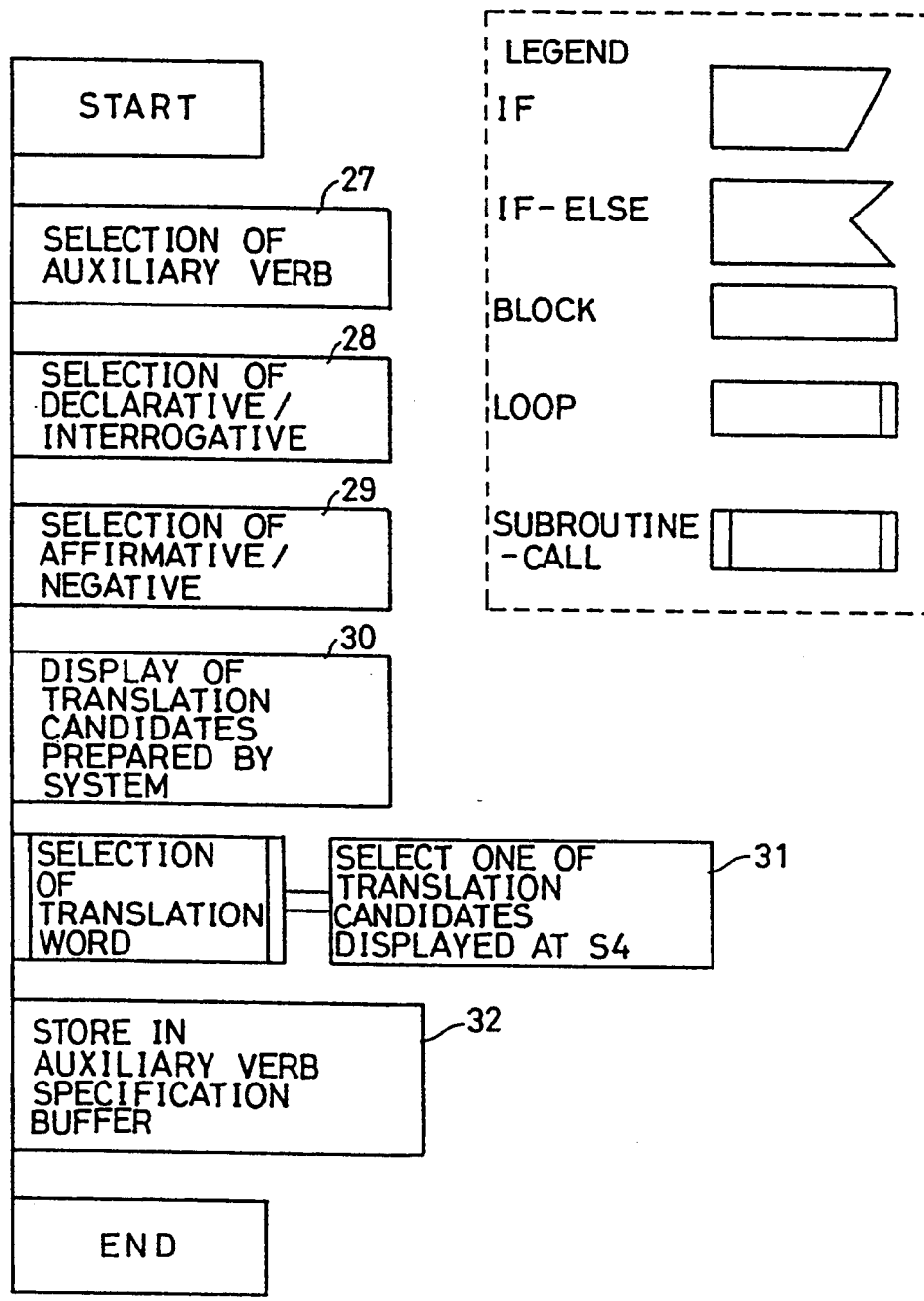
FIG. 4 is flow chart of a buffer creation process for auxiliary verb translation specification.

Referring to FIG. 4, a translation combination (auxiliary verb-condition-translation) is specified by the user as set forth in the following.

At step 27, a process of selecting an auxiliary verb of which a translation is to be determined is carried out. A display example is shown in FIG. 5. Referring to FIG. 5, a list of auxiliary verbs used in a source language (in the present embodiment, English) is displayed as headings 40 on the display screen. The user moves the cursor onto an auxiliary verb to be selected and then depresses the return key (not shown) on keyboard 6.

Referring to FIG. 4 again, specification of the two conditions (declarative/interrogative) and (negative/affirmative) is carried out at steps 28 and 29. An example of this specification is shown on the display screen of FIG. 6. Referring to FIG. 6, four combinations of the first condition 41 and the second condition 42 are displayed on the screen with a respective specified translation 43 for each set. In FIG. 6, those having the flag "SYSTEM_DEPEND" specified as the "Translation Word" of Table 1 is represented by "SYSTEM SPECIFIED TRANSLATION" and those specified with the flag "YAKUSHUTSU SINAI" is represented by "<no translation>". By moving the cursor to a corresponding section of a corresponding combination of conditions and depressing the return key, the selection process of conditions is completed. The example shown in the menu of FIG. 6 has "negative-declarative" sentence specified as the condition.

At step 30 in FIG. 4, translation candidates prepared in advance in the system are displayed. This display of candidates is shown in FIG. 7. Referring to FIG. 7, a heading 44 indicating the specified condition and the current specified translation (currently in the present embodiment "system specified translation") and translation candidates 45 are displayed on the display screen.

At step 31, the user selects a desired translation from the translation candidates displayed at step 30. This selection is carried out by moving the cursor to a translation to be selected under the display state shown in FIG. 7 and depressing the return key.

At step 32, a selected auxiliary verb, an appearing condition specified for that auxiliary verb ("negative/-declarative" in this case), and a selected translation ("BEKIDENAI") as a translation combination is set in the auxiliary verb specifying buffer. The process of step 32 will complete the translation specifying process for one auxiliary verb. As a result of this specification, the display will be shown in FIG. 9, where a specified translation for "negative/declarative" sentence is displayed as "bekidenai".

By carrying out the above-described steps of 27–32 for all the auxiliary verbs which a translation is to be specified and all the appearing conditions thereof, the auxiliary verb translation specification buffer is completed. The actual translation is carried as set forth in the following using this auxiliary verb translation specification buffer.

Referring to FIG. 3, an original sentence 21 (read out from document file 8 of FIG. 1 and stored in memory 4) is subjected to morphological analysis by dictionary look-up/morphological analysis unit 22. More specifically, each word in original sentence 21 is looked up in the translation dictionary in dictionary/rule 3 to obtain grammatical information such as the part of speech and a translation word for carrying out an analysis process regarding the tense, person and number.

Then, an internal structure of the source language is obtained based on the output of dictionary look-up/morphological analysis unit 22 and the grammatical rules included in dictionary/rule 3 (refer to FIG. 1) by syntax analysis unit 23.

Transformation unit 24 shown in FIG. 3 refers to the tree structure transformation rule table included in dictionary/rule 3 (refer to FIG. 1) for transforming the internal structure of the source language obtained by syntax analysis unit 23 into the internal structure of the target language. The converted internal structure is supplied to generating unit 25.

Generating unit 25 allocates a translation word for each word in the internal structure of the target language while referring to the basic dictionary for target language generation included in dictionary/rule 3 (refer to FIG. 1) and the auxiliary verb translation specification buffer, which is the characteristic of the present invention, prepared in memory 4 of FIG. 1 to generate a translated sentence 26. The selection of a translation word represents the feature of the present invention. Assignment of a translation will be described hereinafter with reference to FIG. 8. For the sake of simplicity, it is assumed that the word which is subject to translation is already identified as to be an auxiliary verb, and only the process of which translation word is to be allocated for that word will be described.

Figure 8:
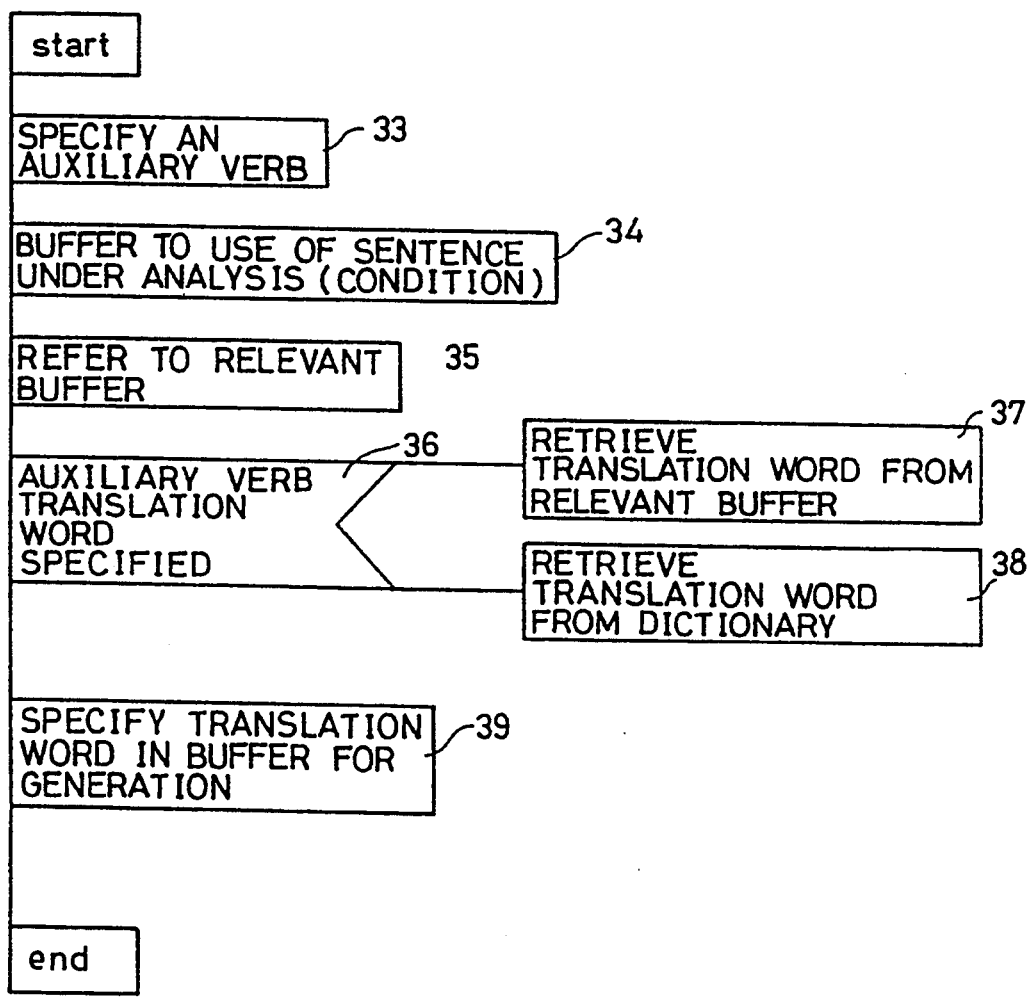
FIG. 8 is a flow chart showing the auxiliary verb translation allocation process in generating a translation sentence.

Referring to FIG. 8, a process to specify an auxiliary verb which is to be processed is carried out at step 33.

At step 34, the use of the sentence being analyzed is referred to. More specifically, determination is made whether the auxiliary verb to be processed appears in an affirmative sentence or a negative sentence (condition 1), and in a declarative sentence or an interrogative sentence (condition 2).

At step 35, a process to refer to the auxiliary verb translation specification buffer is carried out to identify whether there is a translation combination matching the auxiliary verb and appearing conditions specified at steps 33 and 34 in the auxiliary verb translation specification buffer.

At step 36, determination is made whether a translation is specified for the relevant auxiliary verb and condition as the result of the referring process of step 35. If specification has been made, a process of retrieving a translation word from the translation combination is carried out at step 37. Otherwise, a process of retrieving a translation word from a basic dictionary and assigning that word is carried out at step 38.

At step 39, a process of setting the translation word retrieved at step 37 or 38 is carried out in the buffer for generating a translation sentence.

With a translation word specified in advance by the user according to the appearing condition for an English auxiliary verb, a translation procedure set forth in the following is carried out. As an example, it is assumed that the system specified translation word in the basic dictionary for the auxiliary verb of "shall" is "koto ni natteiru". The user has specified the translation word of "bekidenai" when the condition is "negative/declarative", as described in the foregoing. Consider the translation of the following English sentence:

You shall not copy this software.

If this sentence is translated using the system specified translation, the result will be a Japanese sentence:

which literally means "You will not copy this software." This result does not properly represent the meaning of the original English sentence. If the translation combination set in the auxiliary verb specification buffer is used, the above English sentence will be translated into the Japanese sentence of:

which means "You must not copy this software." This result is closer to the actual meaning of the original sentence. Thus, a translation according to the specification of the user can be carried out for an auxiliary verb included in the original sentence by preparing, in the auxiliary verb translation specification buffer, translation combinations of each of the auxiliary verbs, the appearing condition thereof, and a corresponding translation word when that appearing condition is met which are specified by carrying out the procedures shown in FIG. 4. By preparing in advance a set of user's specifications so that appropriate translation is carried out according to the related field, translation of documents of a particular field or area can be carried out in a more appropriate manner.

In the above description, the specification of an auxiliary verb translation by the user is carried out in an auxiliary verb translation specification buffer prepared on memory 4. If memory 4 is a DRAM (Dynamic Random Access Memory), the contents of the auxiliary verb translation specification buffer will be lost when the power of the apparatus is turned off and the buffer is not backed-up. If the contents of this auxiliary verb translation specification buffer is saved in non-volatile memory device 3 in which dictionaries and rules are stored, and by reading out the data to memory 4 prior to calling up translation module 2, the above-described operation can be carried out width no problem. In this case, the auxiliary verb translation specification buffer can be provided in a continuous region on the memory. This is because, although the buffer has a particular data structure, the buffer does not include index such as a pointer to another area. Thus, this buffer may take an array format, for example.

Because the auxiliary verb translation specification buffer may be provided in a continuous area, data transfer between memory 4 and memory device 3 storing the dictionaries and rules can be carried out in a manner of block transfer. More specifically, the contents of the auxiliary verb translation specification buffer is saved by block transferring from memory 4 the same to a file on memory device 3 while maintaining the structure thereof. The read out operation from memory device 3 is carried out by transferring and directly writing in the units of blocks the contents read out from the file into the auxiliary verb translation specification buffer area provided on memory 4. This is possible because the structure on the memory is saved just as it is in the file.

Such a process can directly employ the general process of the conventional processing of files.

The structure of the auxiliary verb translation specification buffer can be made more sophisticated, and data for auxiliary verb translation specification may be held in the file under a structure other than that of the memory. In any case, the element of the translation combination of the information held in the buffer is the translation combination of an auxiliary verb, an appearing condition, and a translation word thereof. The save format of the file is arbitrary as long as it is of a structure that can restore the translation combination. Such a data transfer between a memory and a file can easily be implemented with the conventional techniques used in currently available editors, word processors and data bases.

A plurality of files of auxiliary verb translation specification information can be provided in advance in memory 3. Each file is registered with a name specified by the user according to the contents thereof via the keyboard at the time of file register. The contents thereof are prepared individually for each file. In reading out auxiliary verb translation specification information from a file, the most appropriate file is selected to be read out from the plurality of files to be developed in memory 4. By providing a plurality of files and saving a plurality of sets of appropriate translation combinations to translate documents of a particular field and area for each file, translation is possible based on more appropriate translation words for documents of various fields and areas in comparison with the case where translation is carried out using general translation words.

The specification of a file name may be carried out by the user via keyboard 6. Alternatively, when a user dictionary is selected, a selection system can be taken where a file name assigned in advance in the user dictionary is automatically indicated. This can be realized by various methods such as establishing an auxiliary verb translation specification file name by adding an extension to the name of the user dictionary.

FIG. 10 shows a list of translation candidates indicating which translation is to be assigned for the aforementioned four conditions regarding the three typical English auxiliary verbs of "may", "can", and "shall". The list of candidates shown in FIG. 10 is only a way of example, and other appropriate translation words can be specified according to each user's experience.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An automatic translating apparatus comprising:
   memory means,
   means for preparing in advance in said memory means in a machine readable formal a plurality of translation combinations, each including a predetermined part of speech word of a predetermined source language, an appearing condition of said part of speech word, and a translation word in a predetermined target language selected in advance based on said part of speech word and said appearing condition,
   a machine readable dictionary including a plurality of entries, each having a word of said source language and a translation word selected in advance as a general translation word of said word,
   means for selectively retrieving a translation word of a relevant word from said translation combination or said dictionary based on each word included in the text of said source language and the appearing condition of the relevant word in said text, and
   means for translating the text of said source language into the text of said target language using a translation word extracted for each word in the text of said source language by said retrieving means.

2. The apparatus according to claim 1, wherein said memory means comprises nonvolatile storage means,
   wherein said means for preparing said translation combination comprises means for preparing said translation combination in said nonvolatile memory means.

3. The apparatus according to claim 1, wherein said source language comprises English, and said target language comprises Japanese.

4. The apparatus according to claim 3, wherein said predetermined part of speech comprises an auxiliary verb.

5. The apparatus according to claim 4, wherein said appearing condition defines the type of sentence in which said part of speech word appears.

6. The apparatus according to claim 5, wherein said type of sentence defined by said appearing condition comprises a declarative sentence and an interrogative sentence.

7. The apparatus according to claim 5, wherein said type of sentence defined by said appearing condition comprises a declarative affirmative sentence, a declarative negative sentence, an affirmative interrogative sentence and a negative interrogative sentence.

8. The apparatus according to claim 1, wherein said means for preparing a plurality of translation combinations comprises
   means for displaying a plurality of said predetermined part of speech words of said source language,
   means for selecting an arbitrary one of said displayed plurality of words,
   means for displaying a plurality of said appearing conditions of said selected word,
   means for selecting an arbitrary one of said displayed plurality of appearing conditions,
   means for specifying a translation word in said target language in connection with said selected word and said selected appearing condition, and
   means for relating said selected word, said selected appearing condition, and said specified translation word to each other to store the same as said translation combination in said memory means.

9. The apparatus according to claim 8, wherein said means for specifying a translation word comprises
means for displaying a plurality of translation candidates prepared in advance for said selected word, and a choice for specifying a particular translation method for said selected word,
means for selecting one of said plurality of translation word candidates and said choice, and
means for specifying a translation word to be assigned to said selected word according to said selected translation word candidate or choice.

10. The apparatus according to claim 9, wherein said particular translation method defines that said selected word is not to be translated.

11. The apparatus according to claim 9, wherein said particular translation method defines that the translation word specified by the system for said selected word is to be allocated at the time of translation.

12. An automatic translating apparatus comprising:
manual operable means for inputting a plurality of translation combinations, each including a predetermined part of speech word of a predetermined source language, an appearing condition of a relevant word, and a translation word in a predetermined target language selected in advance based on said word and said appearing condition,
means for storing said plurality of translation combinations supplied using said input means,
a machine readable dictionary including a plurality of entries, each having a word of said source language, and a translation word selected in advance as a general translation word of said word,
means to sequentially read in the text of said source language and refer to said memory means for making determination whether each word included in the text of said source language and the appearing condition in said text of a relevant word match a word and appearing condition included in the translation combinations stored in said memory means, and
means for translating the text of said source language into said target language by selectively retrieving a translation word of a relevant word from one of said storage means and said dictionary according to the determination result of said determination means.

13. The apparatus according to claim 12, wherein said memory means comprises nonvolatile memory means.

14. The apparatus according to claim 13, comprising a plurality of said nonvolatile memory means, each storing individually a plurality of said translation combinations,
said apparatus further comprising
means for selectively storing each of said translation combinations supplied using said input means into any of said plurality of nonvolatile memory means in response to an instruction of an operator,
selection means for selecting said memory means to which said determination means refers from said plurality of nonvolatile memory means.

15. In an automatic translating apparatus including memory means, and means for receiving a text to which a translation word of a predetermined target language is allocated to for each word in the text of a predetermined source language for translating into the text of said target language, a method of translating the text of said source language into the text of said target language, comprising the steps of:
preparing in advance in said memory means in a machine readable format a plurality of translation combinations, each including a predetermined part of speech word of said source language, an appearing condition of a relevant word, and a translation word of said target language selected in advance according to said word and said appearing condition,
preparing a machine readable dictionary including a plurality of entries, each having a word of said source language, and a translation word selected in advance as a general translation of said word,
selectively retrieving a translation word of a relevant word from one of said translation combination and said dictionary according to each word included in the text of said source language and the appearing condition of the relevant word in said text, and
translating the text of said source language into said target language using said retrieved translation word.

16. The method according to claim 15, wherein said memory means comprises nonvolatile memory means,
wherein said step of preparing a dictionary comprises the step of preparing said dictionary in said nonvolatile memory means.

17. The method according to claim 15, wherein said source language comprises English, and said target language comprises Japanese.

18. The method according to claim 17, wherein said predetermined part of speech comprises an auxiliary verb.

19. The method according to claim 18, wherein said appearing condition defines the type of sentence in which said word appears.

20. The method according to claim 19, wherein said defined by said appearing condition comprises a declarative sentence and an interrogative sentence.

21. The method according to claim 19, wherein said type defined by said appearing condition comprises a declarative affirmative sentence, a declarative negative sentence, an affirmative interrogative sentence and a negative interrogative sentence.

22. The method according to claim 15, wherein said step of preparing said plurality of translation combinations comprises the steps of
displaying a plurality of said predetermined part of speech words of said source language,
selecting an arbitrary one of said displayed plurality of words,
displaying a plurality of said appearing conditions of said selected word,
selecting an arbitrary one of said displayed plurality of appearing conditions,
specifying a translation word of said target language in connection with said selected word and said selected appearing condition, and
relating said selected word, said selected appearing condition, and said specified translation word to each other for storing the same as said translation combination in said memory means.

23. The method according to claim 22, wherein said step of specifying a translation word comprises the steps of
displaying a plurality of translation word candidates prepared in advance for said selected word and a choice for specifying a particular translation method, selecting one of said plurality of translation candidates and said choice, specifying a translation word to be allocated to said selected word according to said selected translation candidate or choice.

24. The method according to claim 23, wherein said particular translation method defines that said selected word is not to be translated.

25. The method according to claim 23, wherein said particular translation method defines that a translation word specified by the system is to be allocated for said selected word at the time of translation.

26. An automatic translating apparatus comprising:
memory means;
means for preparing and storing in advance of translation in said memory means in a machine readable format a plurality of translation combinations, each translation combination including a word corresponding to a predetermined part of speech in a predetermined source language, a usage condition defining a context in which said part of speech word is used, and a specified translation word in a predetermined target language selected initially based on said part of speech word and said usage condition;
a machine readable dictionary storing in advance of translation a plurality of dictionary entries, each dictionary entry having a word in said source language and a corresponding general translation word in said target language;
means for selectively retrieving, for each word being translated from a source language text, a specified translation word from said means for preparing when the word being translated and a usage condition for the word being translated matches a predetermined part of speech word and usage condition of a translation combination stored in said means for preparing, and in the absence of such a match retrieving a general translation word from said dictionary corresponding to the word being translated: and
means for translating the source language text into said target language using a translation word retrieved by said means for selectively retrieving for each word in the source language text of said retrieving means.

27. The apparatus according to claim 26, wherein said memory means includes nonvolatile storage means,
wherein said means for preparing includes means for storing each said translation combination in said nonvolatile storage means.

28. The apparatus according to claim 26, wherein said source language is English and said target language is Japanese.

29. The apparatus according to claim 28, wherein said predetermined part of speech is an auxiliary verb.

30. The apparatus according to claim 29, wherein said usage condition defines a type of sentence in which said predetermined part of speech word appears.

31. The apparatus according to claim 30, wherein said type of sentence defined by said usage condition is one of a declarative sentence and an interrogative sentence.

32. The apparatus according to claim 30, wherein said type of sentence defined by said usage condition is one of a declarative affirmative sentence, a declarative negative sentence, an affirmative interrogative sentence and a negative interrogative sentence.

33. The apparatus according to claim 26, wherein said means for preparing includes:
means for displaying a plurality of words corresponding to said predetermined part of speech of said source language;
means for selecting an arbitrary one of said displayed plurality of words;
means for displaying a plurality of said usage conditions of said selected word;
means for selecting one of said displayed plurality of usage conditions;
means for specifying a translation word in said target language corresponding to said selected word and said selected usage condition; and
means for relating said selected word, said selected usage condition, and said specified translation word to each other and storing the same as said translation combination in said memory means.

34. The apparatus according to claim 33, wherein said means for specifying a translation word includes:
means for displaying a plurality of translation candidates previously prepared for said selected word;
means for selecting one of said plurality of translation word candidates; and
means for specifying a translation word to be assigned to said selected word according to said selected translation word candidate.

35. The apparatus according to claim 34, wherein said means for specifying determines that said selected word is not to be translated.

36. The apparatus according to claim 34, wherein said general translation word from said dictionary corresponding to said selected word is to be allocated at the time of translation.

37. An automatic translating apparatus comprising:
manual operable means for inputting in advance of translation a plurality of translation combinations, each translation combination including a word corresponding to a predetermined part of speech in a predetermined source language, a usage condition defining a manner in which said part of speech word is used, and a translation word in a predetermined target language selected based on said part of speech word and said usage condition;
a memory for storing said plurality of translation combinations in advance of translation;
a machine readable dictionary storing in advance of translation a plurality of entries, each dictionary entry having a word in said source language and a corresponding general translation word in said target language;
means for sequentially reading source language text and determining whether each source language word and a usage condition of the source language word match a part of speech word and usage condition included in the translation combinations stored in said memory; and
means for translating the source language text into said target language by selectively retrieving a translation word from one of said memory and said dictionary according to a determination result of said means for determining.

38. The apparatus according to claim 37, wherein said memory includes nonvolatile memory.

39. The apparatus according to claim 38, further comprising:

a plurality of said nonvolatile memories, each storing individually a plurality of said translation combinations, and means for selectively storing each of said translation combinations supplied using said input means into any of said plurality of nonvolatile memories in response to an instruction of an operator.

40. In an automatic translating apparatus including a memory and a translator for translating a text of a source language into a target language, a method comprising the steps off before beginning translation, preparing a plurality of translation combinations, each translation combination including a word corresponding to a predetermined part of speech in said source language, a usage condition identifying how the part of speech word is used in the source language text, and a translation word from said target language selected according to said part of speech word and said usage condition;

storing the prepared translation combinations in a memory before commencing translation;

preparing a machine readable dictionary having a plurality of entries, each dictionary entry having a word of said source language and a corresponding general translation word in said target language;

selectively retrieving for each word being translated a translation word from one of said translation combinations stored in said memory and said entries in said dictionary based on the part of speech and usage of the word being translated; and translating the source language text into said target language using the selectively retrieved translation words.

41. The method according to claim 40, wherein said memory includes nonvolatile memory, and wherein said step of preparing a dictionary includes preparing said dictionary in said nonvolatile memory.

42. The method according to claim 40, wherein said source language is English, and said target language is Japanese.

43. The method according to claim 2, wherein said predetermined part of speech is an auxiliary verb.

44. The method according to claim 43, wherein said usage condition defines the type of sentence in which said part of speech word appears.

45. The method according to claim 44, wherein said type of sentence includes a declarative sentence and an interrogative sentence.

46. The method according to claim 44, wherein said type of sentence includes a declarative affirmative sentence, a declarative negative sentence, an affirmative interrogative sentence and a negative interrogative sentence.

47. The method according to claim 40, wherein said step of storing said plurality of translation combinations includes the steps of displaying a plurality of predetermined part of speech words of said source language, selecting one of said displayed plurality of words, displaying a plurality of usage conditions of said selected word, selecting one of said displayed plurality of usage conditions, specifying a translation word of said target language in connection with said selected word and said selected usage condition, and relating said selected word, said selected usage condition, and said specified translation word to each other and storing the same as said translation combination in said memory.

48. The method according to claim 47, wherein said step of specifying a translation word comprises the steps of displaying a plurality of translation word candidates for said selected word and translation options, selecting one of said plurality of translation candidates and said translation options, specifying a translation word to be allocated to said selected word according said selected translation candidate or translation option.

49. The method according to claim 48, wherein one of said translation candidates options indicates that said selected word is not to be translated.

50. The method according to claim 48, wherein said translation option defines that corresponding general translation word from said dictionary is to be allocated for said selected word at the time of translation.

* * * * *